(12) United States Patent
Zhang et al.

(10) Patent No.: US 10,798,393 B2
(45) Date of Patent: Oct. 6, 2020

(54) TWO PASS CHUNK PARALLEL TRANSCODING PROCESS

(71) Applicant: HULU, LLC, Santa Monica, CA (US)

(72) Inventors: Wenhao Zhang, Beijing (CN); Deliang Fu, Beijing (CN); Juncheng Ma, Beijing (CN); Chen Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/030,688

(22) Filed: Jul. 9, 2018

(65) Prior Publication Data

US 2020/0014944 A1    Jan. 9, 2020

(51) Int. Cl.
*H04N 19/40*    (2014.01)
(52) U.S. Cl.
CPC .................................. *H04N 19/40* (2014.11)
(58) Field of Classification Search
CPC ....................................................... H04N 19/40
USPC ..................................................... 375/240.01
See application file for complete search history.

(56) References Cited

U.S. PATENT DOCUMENTS

| | | | |
|---|---|---|---|
| 9,288,510 B1 * | 3/2016 | Yang ............. | H04N 21/234309 |
| 9,338,467 B1 * | 5/2016 | Gadepalli ........... | H04N 19/127 |
| 9,813,706 B1 * | 11/2017 | Lin ...................... | H04N 19/134 |
| 2009/0274212 A1 * | 11/2009 | Mizutani ............. | H04N 19/115 |
| | | | 375/240.12 |
| 2010/0034257 A1 * | 2/2010 | Sedeffow ............... | H04N 19/40 |
| | | | 375/240.01 |
| 2011/0060792 A1 | 3/2011 | Ebersviller | |
| 2013/0114744 A1 * | 5/2013 | Mutton .................. | H04N 19/40 |
| | | | 375/240.26 |

(Continued)

FOREIGN PATENT DOCUMENTS

| | | |
|---|---|---|
| KR | 10-1845585 B1 | 4/2018 |
| WO | 2015153233 A1 | 10/2015 |

OTHER PUBLICATIONS

U.S. Appl. No. 16/012,419, filed Jun. 19, 2018 by Zhang et al. (Unpublished.).

(Continued)

*Primary Examiner* — Zaihan Jiang
(74) *Attorney, Agent, or Firm* — Fountainhead Law Group PC

(57) ABSTRACT

In one embodiment, a method receives a first chunk in a plurality of chunks from a video. The plurality of chunks are sent to a plurality of transcoding units for transcoding in parallel. The method transcodes the first chunk at a first transcoding unit to generate a first transcoded sub-bitstream. Then, first statistical information is received from one or more second chunks being transcoded by other transcoding units. The first statistical information from the one or more second chunks is compared to second statistical information from the first chunk and it is determined whether to perform a second transcoding process based on the comparing. When the second transcoding process is to be performed, the method performs the second transcoding process with the first chunk to generate a second transcoded bitstream and outputs the second transcoded bitstream. When the second transcoding process is not to be performed, the method outputs the first transcoded sub-bitstream.

20 Claims, 7 Drawing Sheets

(56) References Cited

U.S. PATENT DOCUMENTS

| | | | |
|---|---|---|---|
| 2013/0254386 A1* | 9/2013 | Kim | G06F 15/173 |
| | | | 709/224 |
| 2014/0139733 A1* | 5/2014 | MacInnis | H04N 19/124 |
| | | | 348/441 |
| 2015/0189222 A1* | 7/2015 | John | H04N 21/44008 |
| | | | 348/441 |
| 2016/0156948 A1 | 6/2016 | Yang et al. | |
| 2017/0094290 A1* | 3/2017 | Yuen | H04N 19/436 |
| 2017/0270634 A1* | 9/2017 | Eggebrecht | G06T 15/205 |
| 2018/0288493 A1* | 10/2018 | Hermesh | H04N 21/6118 |
| 2018/0295371 A1* | 10/2018 | Jiang | H04N 19/184 |
| 2019/0068673 A1* | 2/2019 | Giladi | H04L 65/602 |
| 2019/0094027 A1* | 3/2019 | Xu | G01S 19/48 |

OTHER PUBLICATIONS

Search Report and Written Opinion of corresponding application, PCT/US2019/039353, filed on Jun. 26, 2019, dated Oct. 17, 2019.

\* cited by examiner

TWO PASS CHUNK PARALLEL TRANSCODING PROCESS

BACKGROUND

Media programs, including audio-video data, are increasingly distributed over telecommunications networks for the viewing and enjoyment of users. Services provide media programs to users through various video delivery technologies (e.g., streaming). For example, the service may allow a user to view the latest television shows or movies using a media player. After a television show airs, the service may experience a high demand for the television show. In one example, a media program provider provides the television show to the service. The service then needs to transcode the television show before the service can make the television show available to the users. For example, the television show may need to be transcoded into different bitrates. Due to the popularity of the video, the service would like to transcode the media program as fast as possible. However, if the transcoding is performed by one transcoder, the service must wait until the transcoder finishes transcoding the entire television show before making the television show available to users. A typical runtime for transcoding a two-hour 1080p video is about 48 hours using H.264 transcoder. Also, if a higher video resolution video, such as a 4K resolution or even higher, and a more complicated transcoding technique such as High Efficiency Video Coding (HEVC)/H.265 or VP9 is used, the transcoding time of new video content will dramatically increase.

One way of transcoding the video faster is to splice the video into multiple chunks and transcode the chunks using multiple transcoders. Thus, the transcoding can be performed in parallel and the transcoded parts of the video from the transcoders are combined into a single bitstream. While improving the time taken to transcode the video, the splicing method introduces quality issues. For example, a transcoding model, such as a rate control model, inside the transcoder requires a serial transcoding, which will be broken by the parallel transcoding. That is, the transcoder independently processes video within the chunk boundaries. Thus, video quality fluctuation may occur at the chunk boundaries.

DETAILED DESCRIPTION

Figure 1:
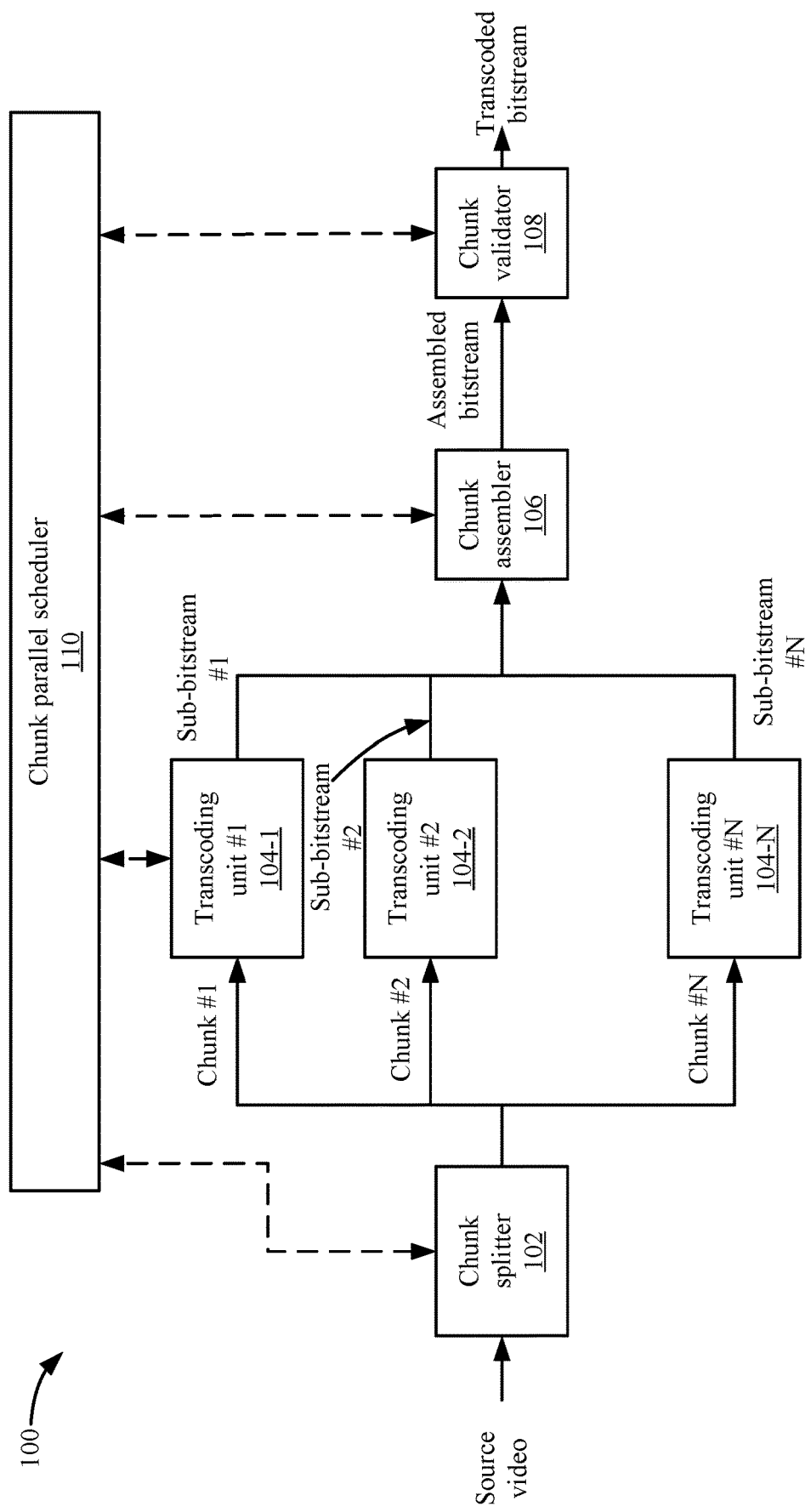
FIG. 1 depicts a simplified system for performing chunk parallel transcoding according to some embodiments.

Described herein are techniques for a video transcoding system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments use a chunk parallel transcoding technique that transcodes chunks of a video in parallel using multiple transcoding units in a transcoding cloud system. The chunk parallel transcoding technique may decrease the time needed to transcode the video compared to performing the transcoding of the video in serial in one transcoding unit. The transcoding units are configured to transcode the video independently. That is, each chunk of video is processed and compressed on a single transcoding unit frame-by-frame from beginning to end in a serial manner. The chunk parallel transcoding may split one video asset into multiple chunks that are processed and transcoded by multiple transcoding units in parallel. For example, a two-hour video may be split into 12 ten-minute chunks that are transcoded into 12 sub-bitstreams by 12 transcoding units in parallel. When the transcoding of the chunks is finished, the system assembles the sub-bitstreams into a full-length transcoded bitstream that represents the transcoding of the entire video.

Splitting the video into multiple chunks may introduce quality issues in the final transcoded bitstream. For example, quality fluctuation may be observed across transcoded sub-bitstreams for chunks especially at the boundaries of the chunks. One reason the quality issues occur at the boundaries is that a transcoder serially transcodes the video and when the video is split at a chunk boundary, the video before the video is not used in the transcoding of the chunk. This limits the quality of the transcoding because the transcoder cannot use the frames before the boundary to transcode the frames after the boundary. This may result in quality issues at the boundaries.

Some embodiments address the quality issue by performing a two pass transcoding process of the chunks. The two pass transcoding process may use statistics from other chunks to determine whether a second transcoding process is needed after a first transcoding process is performed. In some embodiments, the second transcoding process may be performed when the statistics indicate that content from neighboring chunks may be similar to the content within the chunk. The similarity of the content may introduce quality issues around the boundary if a chunk is transcoded independently. For example, when content is similar to a neighboring chunk, that content may be useful when transcoding the current chunk. This is because transcoding leverages the content of neighboring frames when the content is similar to increase the compression achieved in the transcoding unit. When content is not similar, then the transcoding does not leverage the content as much or at all.

The number of other chunks in which statistics are received for a current chunk may vary. For example, the system can generate chunk boundaries for the video to form chunks from the video. Then, the system can select a first number of chunks before a left boundary of the chunk and/or a second number of chunks after the right boundary of the chunk. The number of chunks selected may be based on the analysis of different factors, such as the content of the chunk around the boundary. For example, if the video is similar around the chunk boundary, then more chunks around the chunk boundary may be used because the quality of the transcoding can be increased using the additional chunks. However, if the content around the chunk boundary is vastly different, then content from the chunks outside the chunk boundary may not be useful in performing the transcoding and thus fewer chunks may be used outside the chunk boundary. In other embodiments, a fixed number of chunks outside the chunk boundaries may be used.

Each transcoding unit may individually determine whether a second transcoding is needed based on the statistics from other chunks. The transcoding units then transcode the chunks in parallel. Some chunks may be transcoded more than once, but some chunks may be transcoded only once. For example, a current chunk that includes content that is not similar to neighboring chunks might not benefit from a second transcoding process because the content from the other chunks might not increase the quality of the current chunk that much if at all. This chunk is transcoded only once. However, another chunk that includes content similar to neighboring chunks might benefit from a second transcoding process because the content from the other chunks might increase the quality of the transcoding around the chunk boundaries and this chunk is transcoded twice. The second transcoding process may use altered parameters that are determined based on the statistics from the other chunks. Once receiving all the transcoded chunks, the system assembles the sub-bitstreams into a final transcoded bitstream.

System Overview

FIG. 1 depicts a simplified system 100 for performing chunk parallel transcoding according to some embodiments. System 100 transcodes a source video asset, which may be any type of video, such as for a television show, movie, or video clip. The source video may need to be transcoded into one or more formats, such as one or more bitrates, and also within a certain time, such as within 24 hours of receiving the video. To decrease the time needed to transcode the source video, system 100 may use the chunk parallel transcoding techniques described herein.

A chunk splitter 102 receives the source video and can split the source video into multiple chunks. A chunk may be a portion of video in the source video. For example, chunk splitter 102 may receive a file with the source video that is the full length of the video and then split the video into multiple chunks.

In some examples, chunk splitter 102 may first determine chunk boundaries for the source video. A chunk may define a boundary for the chunk that will be transcoded by one of transcoding units 104-1 to 104-N. A chunk may include a left boundary that defines the starting point of the chunk and a right boundary that defines the end of the chunk. As will be discussed in more detail below, chunk splitter 102 may initially determine the chunk boundaries, such as using ten-minute intervals for the chunk boundaries. Then, chunk splitter 102 may also analyze the content around the chunk boundaries and determine chunks before the left boundary and/or chunks after the right boundary to use to signal statistics to a current chunk. The statistics from other chunks may allow transcoding units 104 to perform a higher quality transcoding of the chunk compared to if only the video within the boundaries was used. The higher quality transcoding may be possible because transcoding unit 104 can use the statistics from the chunks outside the boundary to determine whether a second transcoding process should be performed. In the second transcoding process, a transcoding unit 104 may alter the parameters used to transcode the chunk, such as transcoding unit 104 alters the parameters based on the statistics received by the neighboring chunks.

The altered parameters may leverage some information from the other chunks, such as statistics about the content of the other chunks.

Transcoding units 104 may be a software video processor/transcoder configured on a computer processing unit (CPU), a hardware accelerated video processor/transcoder with a graphical processing unit (GPU), or field programmable gate array (FPGA), and/or a hardware processor/transcoder implemented in an application-specific integrated circuit (ASIC). Each transcoding unit 104 may be situated in a different device, in the same device, or combined into multiple devices. In some embodiments, a number of transcoding units 104 in a cloud computing environment can be configured depending on the number of chunks output by chunk splitter 102. Transcoding may be the conversion from one digital format to another digital format. Transcoding may involve decoding the source format and encoding the source video into another digital format, or converting the source video into videos with a specific resolution, framerate, bitrate, codec, etc. Also, encoding may be the conversion of analog source content and to a digital format. As used, the term transcoding may include encoding.

Transcoding units #1 to # (N) (104-1 to 104-N) receive the chunks and transcode the chunks in parallel. For example, transcoding unit #1 receives a chunk #1; transcoding unit #2 receives a chunk #2; and transcoding unit # (N) receives a chuck # (N). Although transcoding units may process only one chunk per source video, it is possible that transcoding units 104 may process more than one chunk per source video. However, for a complete parallel transcoding, the number of chunks may equal the number of transcoding units 104.

A transcoding unit 104 may receive a chunk of video and then output one sub-bitstream. Transcoding units 104 also individually determine whether a second transcoding is needed. Also, although a second transcoding is described, more than two transcoding processes may be performed, such as transcoding unit 104 may continue to evaluate the quality of a transcoding and alter the parameters until the quality of the transcoding is acceptable. In some embodiments, for a certain time, each transcoding unit 104 can transcode a single chunk and output a single sub-bitstream. The second transcoding process will likely increase the time to output a single sub-bitstream, however.

A chunk assembler 106 receives N sub-bitstreams, such as one from each transcoding unit 104. Then, chunk assembler 106 assembles the sub-bitstreams and can generate an assembled bitstream. The assembled bitstream is a single transcoded bitstream for the source video.

Chunk assembler 106 cascades the sub-bitstreams according to the temporal order of the chunks. Then, chunk assembler 106 assembles the chunks together into the assembled bitstream.

Chunk validator 108 receives the assembled bitstream and can validate the bitstream. The validation may check the assembled bitstream based on different factors. For example, the factors may include completeness, correctness, overall quality, and cross-chunk quality. Completeness checks that there are no missing chunks, correctness checks that the chunks are in right order, overall quality checks the overall bitrate complies with any bitrate requirements, and cross-chunk quality checks a fluctuation of bitrate and quality across chunks are within pre-defined conditions.

Chunk parallel scheduler 110 may collect information from chunk splitter 102, transcoding unit 104, chunk splitter 106, and chunk validator 108 to coordinate the scheduling of the various stages of the transcoding of the source video.

Chunk parallel scheduler 110 can coordinate the chunk parallel transcoding to achieve the optimal chunk parallel transcoding results. For example, chunk parallel scheduler 110 may schedule chunk splitter 102 to split the source video into chunks. Then, chunk parallel scheduler 110 configures the number of transcoding units 104 that are needed and schedules the transcoding at transcoding units 104. Thereafter, chunk parallel scheduler 110 schedules chunk assembler 106 to assemble the sub-bitstreams into an assembled bitstream. Then, chunk parallel scheduler 110 schedules chunk validator 108 to validate the assembled bitstream.

Chunk Generation

As discussed above, system 100 improves the chunk parallel transcoding process by using statistics from chunks before a left chunk boundary and/or after a right chunk boundary of a current chunk to determine whether a second transcoding process should be performed.

In some embodiments, chunk splitter 102 generates chunk boundaries for a source video using different processes. For example, fixed-length chunks and fixed-count chunks may be used. For the fixed-length chunks, chunk splitter 102 generates chunk boundaries every T seconds of the source video. For the fixed-count chunks process, given a fixed count of C, chunk splitter 102 generates chunk boundaries to generate C even-length chunks. It is possible that the last chunk may not be an even length.

Other methods to generate chunk boundaries include using scene-change chunk boundaries, IDR chunk boundaries, or fixed-size/similar-size chunk boundaries. For the scene-change chunk boundaries, chunk splitter 102 analyzes the source video to determine when scene changes occur. For example, scene changes may be when a large amount of content changes in the video because the scene changes from one location to another location. Also, the scene-change chunks may be determined at different camera shots. In some embodiments, chunk splitter 102 generates chunk boundaries in source video to generate variable length chunks based on when boundaries of scene changes occur.

IDR frames exist in certain transcoding protocols, such as H.264/AVC, Motion Pictures Experts Group (MPEG) 4, etc. An IDR frame may be a first picture that is transcoded in a group of pictures that are transcoded together. Although an IDR frame is described, other frames may be used, such as an I frame. Typically, an IDR frame or an I frame may be transcoded without reference to any other frames. Chunk splitter 102 may determine the positions of IDR frames and then generate chunk boundaries in the source video using the position of IDR frames as boundaries. The resulting chunks may be of variable length depending on the IDR positions of in the source video. The size of each chunk will not be identical since the chunk boundary may happen when IDR frames occur.

The fixed-size or similar-size chunks are different from the fixed-length chunk in that the size of the chunks does not depend on the length. That is, the size may be the number of bytes in the chunk. The size may be used when the network transition efficiency of the chunks is optimized because the network can deliver chunks of the same size. Chunk splitter 102 generates chunk boundaries every T bytes of source video.

Two Pass Transcoding Process

Figure 2:
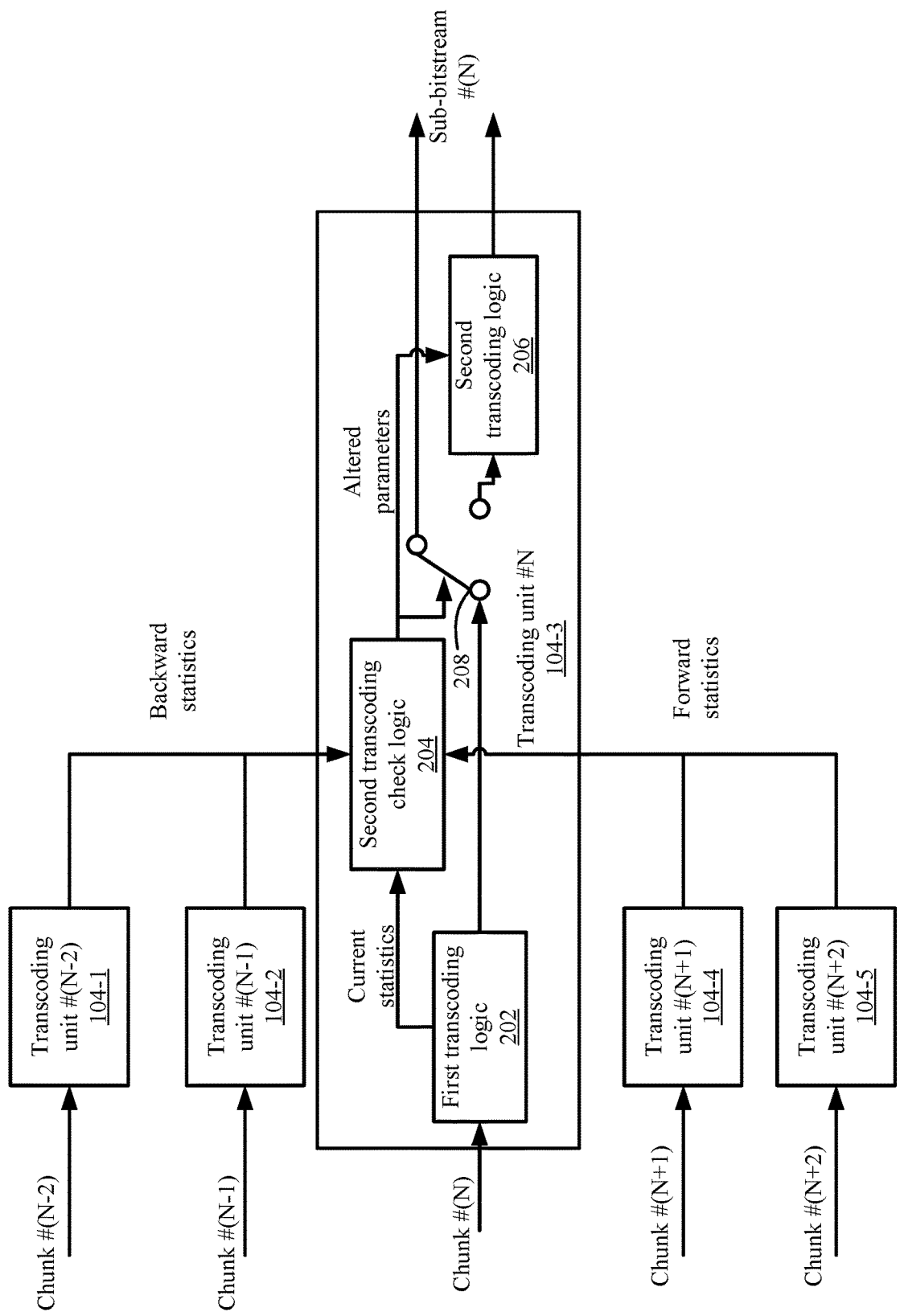
FIG. 2 depicts a more detailed example of a transcoding unit # (N) according to some embodiments.

Once the chunks are generated, transcoding units 104 transcode the chunks. FIG. 2 depicts a more detailed example of a transcoding unit # (N) 104-3 according to some embodiments. The architecture described with respect to transcoding unit # (N) may be included in all other transcoding units 104 in some embodiments. In other embodiments, the architecture described with respect to transcoding unit # (N) is included in at least one other transcoding unit 104. Each transcoding unit 104 may perform its own second transcoding check to determine whether a second transcoding process is needed. Accordingly, in some examples, some transcoding units 104 may output a sub-bitstream from the first transcoding process and some transcoding units 104 may output a sub-bitstream from a second transcoding process. Either the first transcoding process is output without the second transcoding process, or the second transcoding process is output without the first transcoding process. It will be noted that although a second transcoding process is described, transcoding units 104 may also perform a third transcoding process or more depending on the quality of the last transcoding. For example, transcoding unit 104 may continue to transcode the video until one or more criterion are fulfilled, such as the resulting bitrate and overall quality of a current chunk meet a criterion, the quality fluctuation at the boundaries of the current chunk is acceptable within a threshold, and so on.

A chunk # (N) is received at a transcoding unit # (N) 104-3, where N is a number. For example, transcoding unit # (N) may be transcoding unit #5 and is processing chunk #5 if N=5. Other transcoding units are noted as transcoding unit # (N−2) 104-1, transcoding unit # (N−1) 104-2 before transcoding unit # (N). Transcoding unit # (N−2) is processing a chunk # (N−2) and transcoding unit # (N−1) is processing a chunk # (N−1). After chunk # (N), a transcoding unit # (N+1) 104-4 is processing a chunk # (N+1) and a transcoding unit # (N+2) 104-5 is processing a chunk # (N+2).

In transcoding unit # (N), first transcoding logic 202 transcodes chunk # (N) to generate a sub-bitstream # (N). Then, second transcoding check logic 204 analyzes the first transcoding to determine if a second transcoding process should be performed. The logic for second transcoding check logic 204 may be embedded in transcoding unit # (N) and second transcoding check logic 204 collects backward statistics and/or forward statistics from other transcoding units 104. For example, transcoding unit # (N−2) and/or transcoding unit # (N−1) may send backward statistics to second transcoding check logic 204 and transcoding unit # (N+1) and transcoding unit # (N+2) may send forward statistics to second transcoding check logic 204. The backward statistics are statistics from chunks before chunk # (N) and the forward statistics are statistics from chunks after chunk # (N) in a timeline order of the transcoding. The number of backward chunks and forward chunks from which statistics are received may be determined dynamically. For example, the content of the video may be analyzed around the chunk boundaries of chunk # (N) to determine the similarity of the content. If the content around a chunk boundary is similar, then statistics from more chunks from other transcoding units may be used. However, if the content is not similar around the chunk boundary, then fewer statistics or no statistics from chunks from other transcoding units may be received. The use of fewer statistics from other chunks may make the second transcoding check logic 204 more efficient because second transcoding check logic 204 has to analyze less information. The additional statistics from more chunks may be used when content is similar and the second transcoding process may need the statistics from the other chunks to make a better determination if a second transcoding process should be performed or used later to improve the quality of the transcoding in the second transcoding process. That is, when the chunks include different content than the content within the current chunk, the content from the other chunks is less helpful in transcoding frames for the current chunk because transcoding leverages similarities in content to transcode the content. Thus, the quality of the transcoding within the current chunk is not greatly affected when not using frames outside the current chunk when the content is not similar. However, if the content before the left boundary or after the right boundary of the current chunk include similar content to the frames within the left boundary or right boundary, respectively, the quality of the transcoding of the current chunk may decrease at the chunk boundaries.

Second transcoding check logic 204 may analyze the backward statistics and forward statistics in addition to current statistics from first transcoding logic 202. The current statistics are the statistics from the transcoding of the current chunk # (N). Second transcoding check logic 204 can then determine whether or not to initiate a second transcoding process using second transcoding process logic 206. The analysis performed by second transcoding check logic 204 will be described in more detail below. Depending on the analysis of the backward statistics and forward statistics from other chunks, second transcoding check logic 204 may output a signal to a switch 208. When a second transcoding process is not needed, switch 208 may be in the position shown where the sub-bitstream # (N) from first transcoding logic 202 is output by transcoding unit # (N). However, when a second transcoding process is required, second transcoding check logic 204 toggles switch 208 to connect first transcoding logic 202 to second transcoding process logic 206. Additionally, second transcoding check logic 204 may send altered parameters to second transcoding process logic 206. The altered parameters may be determined based on the analysis of the backward statistics, current statistics, and forward statistics. The altered parameters may be configured to improve the quality around the boundaries because information from other chunks is used to determine the altered parameters. By comparing the quality of frames before and after a boundary, the altered parameters can be determined. For example, if the quality of the frames at the beginning of current chunk # (N) is worse than the ending frames of previous chunk # (N-1) over a threshold, a quality fluctuation will be observed. In this case, the transcoding parameters of the frames at the beginning of current chunk # (N) should be altered to generate a transcoding with better quality.

Second transcoding logic 206 then performs a second transcoding process of chunk # (N) using the altered parameters of the source video. Although the output of first transcoding logic 202 is connected to second transcoding process logic 204, the original source video may be transcoded by second transcoding process logic 206. Second transcoding logic 206 may use the altered parameters, such as a modified quantization parameter, rate control model parameters, etc. to improve the quality of fluctuation at the boundaries of the current chunk. For example, if there is a quality drop at the boundary between the current chunk # (N) and previous chunk # (N-1), the second transcoding process should be applied in transcoding unit # (N) to increase the quality of the frames at the beginning of chunk # (N). To achieve the quality targets, backward statistics from the first transcoding of encoding in transcoding unit # (N-1), such as resulting bitrate, final rate control model parameters, final quantization parameters (QPs) and so on, may be sent to transcoding unit # (N). Then transcoding unit # (N) could use options to launch a second transcoding to chunk # (N). The options include but are not limited to altering a target encoding bitrate of chunk # (N) towards the resulting bitrate of chunk # (N-1), setting the initial QP of chunk # (N) to be equal to the final QP of chunk # (N-1), and/or setting the initial rate control parameters of chunk # (N) equal to the final rate control parameters of chunk # (N-1).

Forward and Backward Statistic Determination

Figure 3:
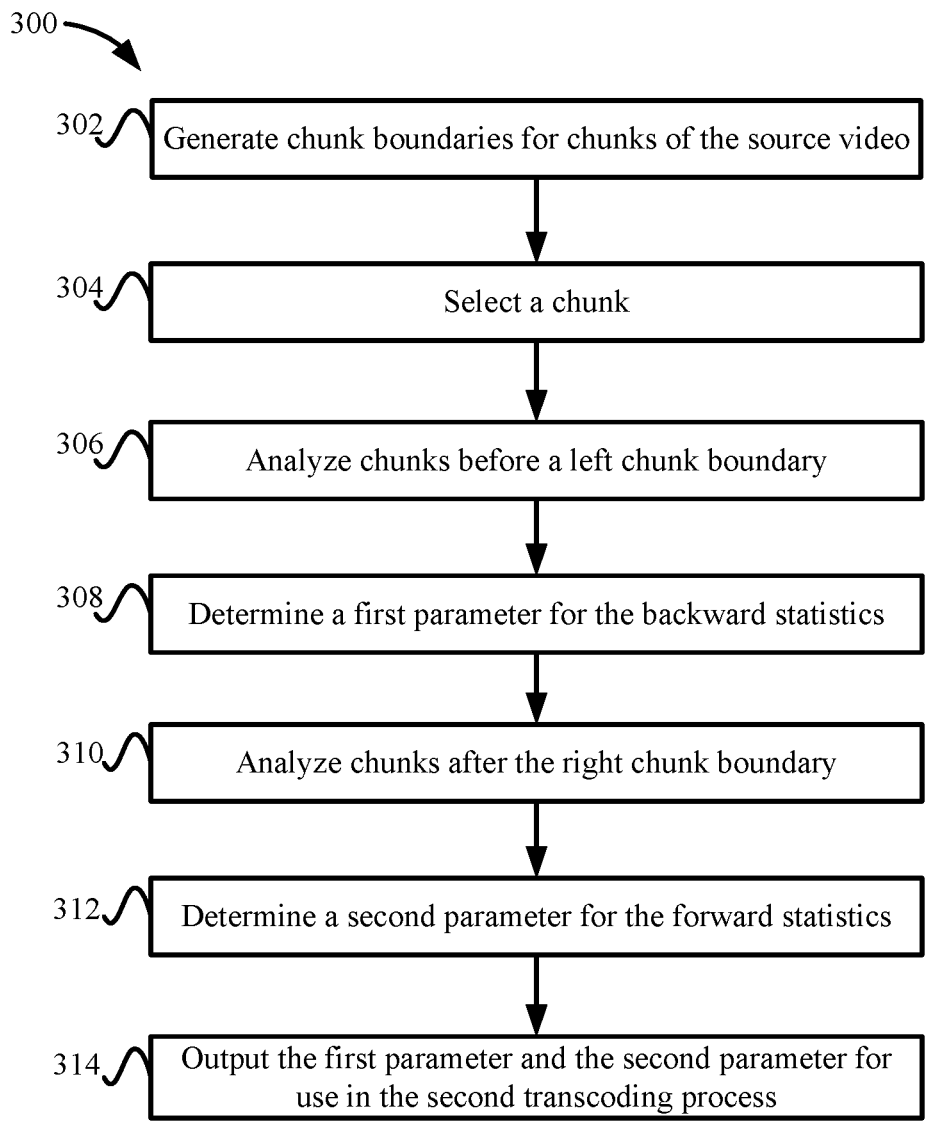
FIG. 3 depicts a simplified flowchart of a method for determining the number of chunks in which to receive the statistics for a current chunk according to some embodiments.

FIG. 3 depicts a simplified flowchart 300 of a method for determining the number of chunks in which to receive the statistics for a current chunk according to some embodiments. At 302, chunk splitter 102 generates chunk boundaries for chunks of the source video. Then, chunk splitter 102 may analyze the chunks to determine how many chunks before the chunk and how many chunks after the chunk should be included in the second transcoding check. At 304, chunk splitter 102 selects a chunk, such as chunk # (N). Then, at 306, chunk splitter 102 analyzes chunks before the left chunk boundary for the chunk. The number of chunks chunk splitter 102 analyzes may be a fixed number or may vary based on the content. Chunk splitter 102 may analyze the content of the chunks and compare the content to the content of the current chunk.

At 308, chunk splitter 102 determines a first parameter for the backward statistics that may be used to determine the number of chunks in which to receive the backward statistics. For example, if the first parameter is two, then the number of chunks used before the chunk is two chunks. In some embodiments, when the content of the chunks before the left chunk boundary is similar to the content within the chunk, then the first parameter is increased. However, if the content of the chunks before the left chunk boundary is not similar to the content within the chunk, then the first parameter is decreased. Chunk splitter 102 may analyze different content characteristics, such as by comparing differences between content characteristics for chunks to a threshold to determine the first parameter. The content characteristics of X continuous chunks can be compared when determining the forward statistics and the backward statistics, where X is a pre-defined value.

Similar to above with respect to the left chunk boundary, at 310, chunk splitter 102 analyzes chunks after the right chunk boundary. At 312, chunk splitter 102 determines a second parameter for the forward statistics. Chunk splitter 102 determines the second parameter in a similar fashion as described above with respect to determining the backward statistics. In some embodiments, the first parameter and the second parameter may be the same value. However, the first parameter and the second parameter may be different if the content is less similar at either the left chunk boundary or the right chunk boundary.

At 314, chunk splitter 102 outputs the first parameter and the second parameter for use in the second transcoding process.

Two Pass Transcoding

Figure 4:
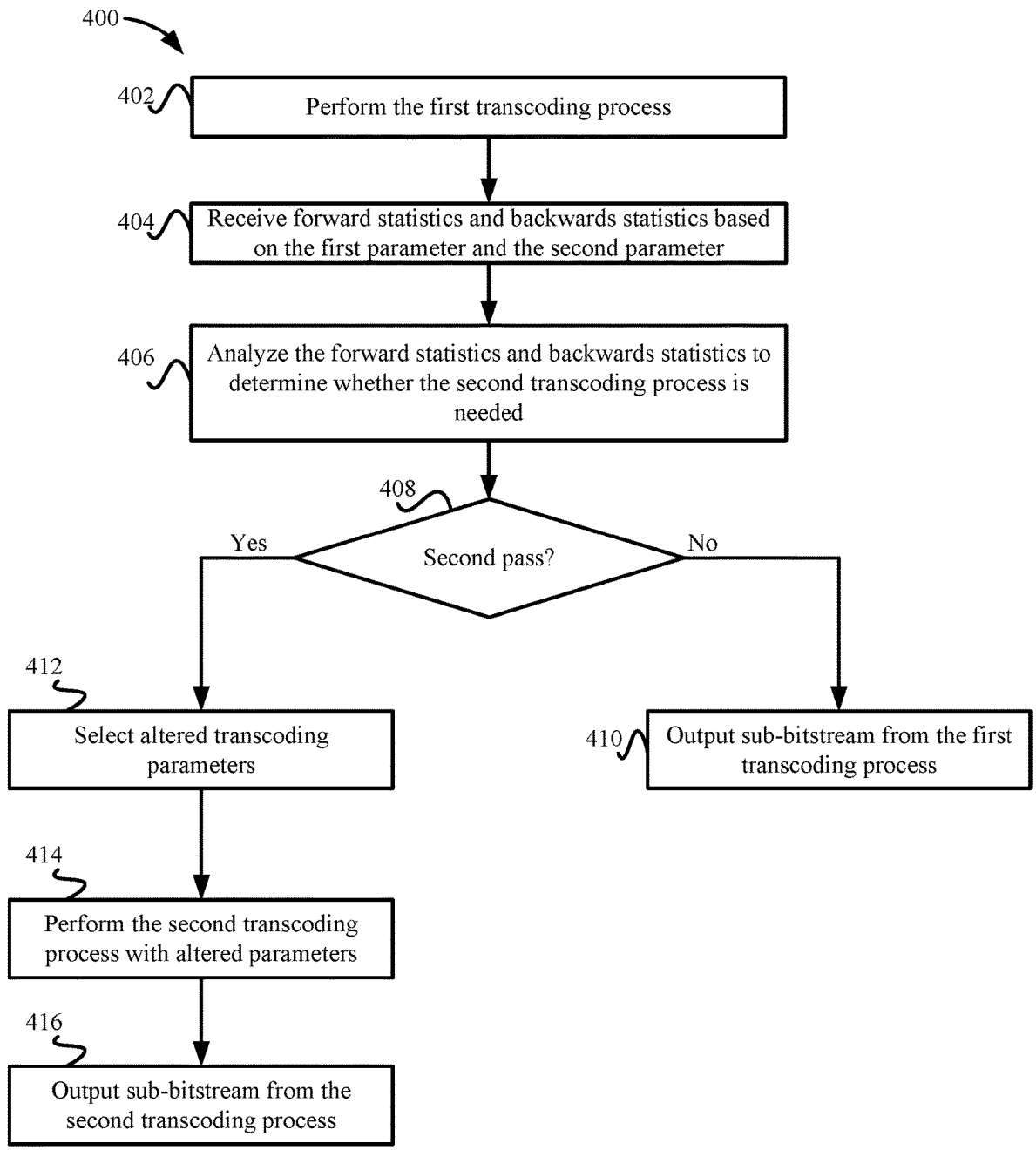
FIG. 4 depicts a simplified flowchart of a method for performing the two pass transcoding process according to some embodiments.

FIG. 4 depicts a simplified flowchart 400 of a method for performing the two pass transcoding according to some embodiments. At 402, transcoding unit # (N) performs a first transcoding process. The first transcoding process is performed without any information from other chunks.

At 404, transcoding unit # (N) receives forward statistics and backward statistics from a number of chunks based on the first parameter and the second parameter. As discussed above, the first parameter and the second parameter may be a fixed value or may be variable. Chunk parallel scheduler 110 may configure each transcoding unit 104 to send backwards or forwards statistics to other transcoding units 104. The statistics (either the forward statistics or the backward statistics) may be derived from video content characteristics, including but not limited to content complexities, such as a number of objects, a number of edges, a magnitude of texture, etc., and temporal complexities, such as the magnitude of object motion, a diversity of the motion directions, etc. The content complexities and temporal complexities are determined based on analyzing the content. The number of objects are a number of objects that are recognized in the chunk (e.g., people, furniture, etc.). The number of edges is the edges found from an edge detection of the content. The magnitude of texture is a measurement of video local variances of pixels. A magnitude of object motion is a measurement of an amount of motion of objects in the chunk. A diversity of motion direction is the distribution of movement in the chunk, which can be measured by the variance of motion vectors or optical flows of objects. Further, first transcoding process results, such as the resulting bitrate, average quantization parameter, quality measurements, etc., may be received from other transcoding units and also from the first transcoding process of the current chunk. The transcoding results are determined based on the transcoding that was performed. The average bitrate is an average of the bitrate of the transcoded chunk. The average quantization parameter regulates how much spatial detail is saved in the transcoding. The quality measurements are metrics of video quality such as peak signal-to-noise ratio (PSNR) or structural similarity (SSIM), etc.

At 406, transcoding unit # (N) analyzes the forward statistics and the backward statistics to determine whether a second transcoding process is needed. For example, transcoding unit # (N) may compare the forward statistics to current statistics from the current chunk and also the backward statistics to the current statistics. If the forward statistics and/or the backward statistics are similar to the current statistics within a threshold, then a second transcoding process may be used. The second transcoding process may be used because the neighboring chunks may share similar video content characteristics and the second transcoding process should be applied to increase the quality at the boundary of the current chunk. That is, some information from the other chunks may be useful in transcoding the current chunk. For example, the number of edges, magnitude of texture, or motion intensity from the other chunks may be compared to the statistics from the current chunk. In some embodiments, if the quantity differences from one or more of the statistics are smaller than one or more thresholds, then the current chunk is determined to have similar content characteristics with the previous chunk or the subsequent chunk. In some examples, if the number of edges is 1000 in the backwards statistics and is 1100 in the current statistics, and a threshold of 200 is used, then the difference of 100 meets the threshold (e.g., is below). Similar comparisons for the other statistics may be used. Meeting the threshold means that the content is determined to be similar between the neighboring chunk and the current chunk because the neighboring chunk and the current chunk have a similar number of edges.

In some embodiments, transcoding unit # (N) compares the backward statistics with the current statistics to one or more thresholds and also the forward statistics with the current statistics to one or more thresholds. If there are multiple types of statistics being compared, then transcoding unit # (N) may require that the content be similar for one or more of different types of statistics, such as greater than 75% of the different types of statistics. For example, if only one statistic type of the number of edges is similar, then transcoding unit # (N) may determine that the second transcoding process is not needed. However, if two types of statistics, such as the number of edges and the magnitude of texture meet the threshold, then transcoding unit # (N) performs a second transcoding process. In other embodiments, if any of the types of statistics meet the threshold, transcoding unit # (N) may determine that a second transcoding process is needed.

Transcoding unit # (N) may also compare the first transcoding process statistics, such as a bitrate, quantization parameter, or quality measurements (e.g., PSNR or SSIM). The transcoding statistics are transcoding results from the transcoding and the content characteristics are from the content itself. Transcoding unit # (N) may compare the first transcoding process results from the backward statistics with first transcoding process results from the current statistics and also first transcoding process results between the current statistics and the forward statistics. Once again, transcoding unit # (N) may compare the differences to a threshold and if the differences meet a threshold, then this indicates that the current chunk has similar content characteristics with the previous chunk and/or the subsequent chunk. Transcoding unit # (N) may determine that a second transcoding process of the current chunk is applied when one or more of the first transcoding process results meet the threshold.

From the above comparisons, at 408, transcoding unit # (N) determines if a second transcoding process is needed. If not, transcoding unit # (N) outputs the sub-bitstream from the first transcoding.

If the second transcoding process is needed, then at 412, transcoding unit # (N) selects altered transcoding parameters. Transcoding unit # (N) may determine the altered transcoding parameter based on the above comparisons and the backwards and/or forward statistics.

At 414, transcoding unit # (N) performs the second transcoding process with the altered parameters. Then, at 416, transcoding unit # (N) outputs the sub-bitstream from the second transcoding process.

Bitstream Assembly

Figure 5:
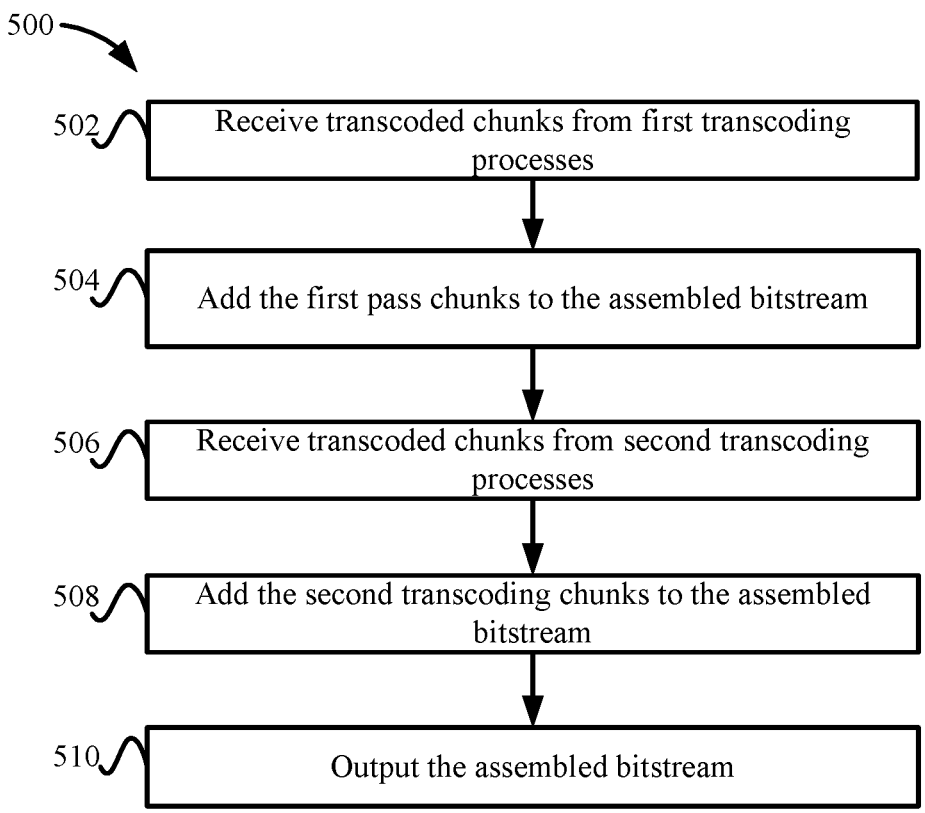
FIG. 5 depicts a simplified flowchart of a method for generating the assembled bitstream according to some embodiments.

Chunk assembler 106 may receive a first transcoding process or a second transcoding process. FIG. 5 depicts a simplified flowchart 500 of a method for generating the assembled bitstream according to some embodiments. At 502, chunk assembler 106 receives transcoded chunks from the first transcoding processes. Chunk assembler 106 may receive the transcoded chunks from the first transcoding processes before the second transcoding processes are performed because the second transcoding processes take more time due to the second transcoding processes being performed again. At 504, chunk assembler 106 adds the first transcoding process chunks to the assembled bitstream. In some examples, chunk assembler 106 knows the location of the chunks and can insert the chunks based on the time in the video. In other examples, chunk assembler 106 can add first transcoding process chunks serially to generate the assembled bitstream until a first transcoding process chunk from a transcoding unit is not received. At this point, chunk assembler 106 waits to receive the second transcoding process. Chunk assembler 106 may then store the rest of first transcoding process chunks to later insert into the assembled bitstream.

At 506, chunk assembler 106 receives the transcoded chunks from the second transcoding processes. The transcoded chunks from the second transcoding processes may be received after the transcoded chunks from the first transcoding processes. Then, at 508, chunk assembler 106 adds the transcoded chunks from the second transcoding processes to the assembled bitstream. In some embodiments, chunk assembler 106 may insert the second transcoding chunks in between the first transcoding process chunks in the assembled bitstream based on the time order of the second transcoding chunks. In other examples, if chunk assembler 106 had stopped inserting the first transcoding process chunks when a first transcoding process chunk was missing, chunk assembler 106 may continue to generate the assembled bitstream using the second transcoding chunks and the stored first transcoding process chunks. Once the assembled bitstream is generated, chunk assembler 106 outputs the assembled bitstream.

CONCLUSION

Accordingly, some embodiments perform a second transcoding process when quality around the chunk boundaries may be affected by the chunk parallel encoding process. The process increases the quality of the transcoding while allowing the transcoding to be performed faster. For example, a second transcoding process is only performed when needed based on a comparison of backwards statistics, current statistics, and/or forward statistics. Additionally, the amount of information transferred between transcoding units 104 may be limited to statistics rather than the actual content of the chunks. This may limit the amount of information that is transferred between transcoding units. This may also increase the speed of determining whether the second transcoding process should be performed because each transcoding unit does not need to analyze content. Rather, the statistics are compared, which is a faster comparison than comparing content.

System

Figure 6:
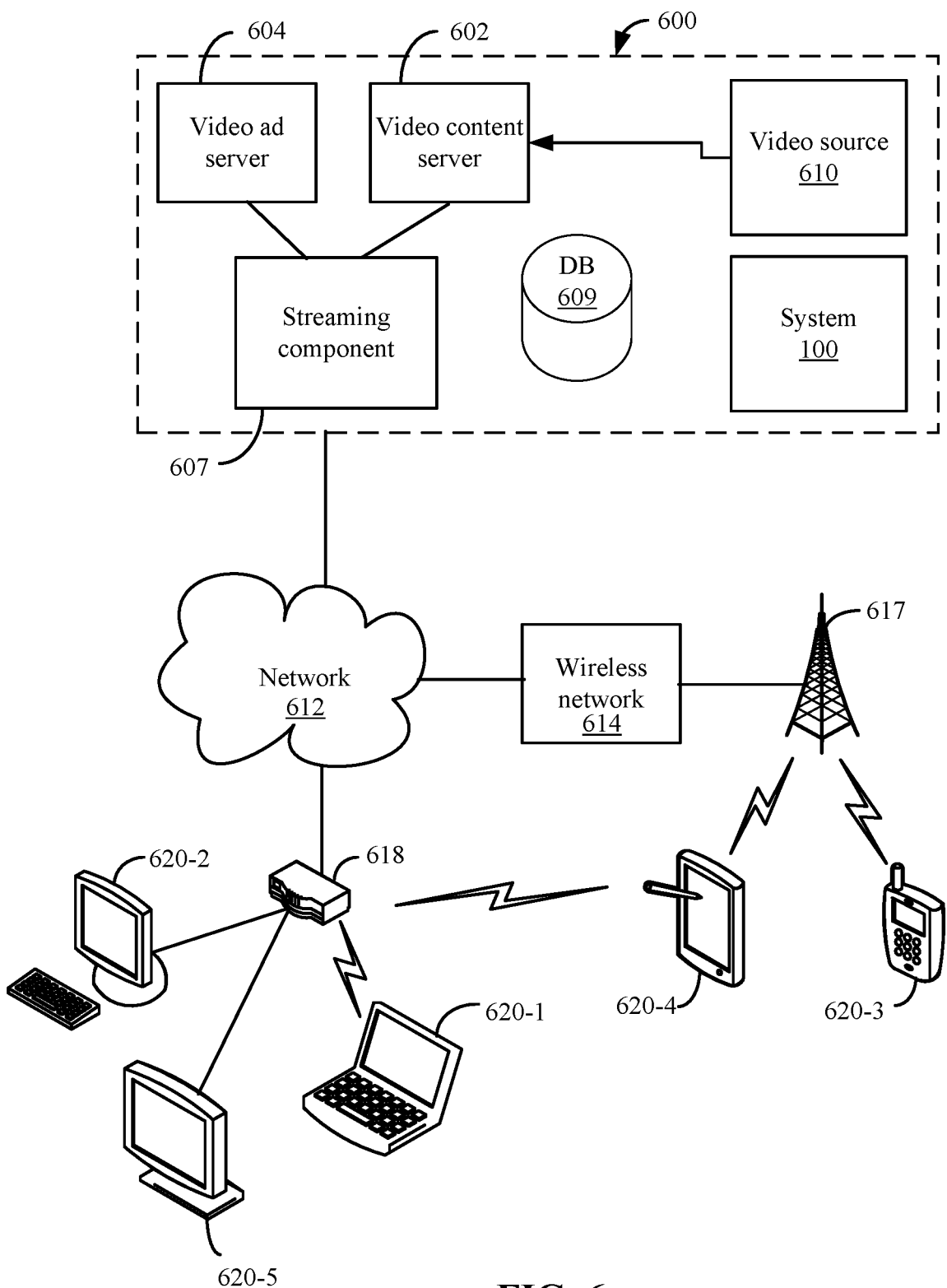
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include system 100.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612, wireless cellular telecommunications network 614, and/or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless cellular telecommunications network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
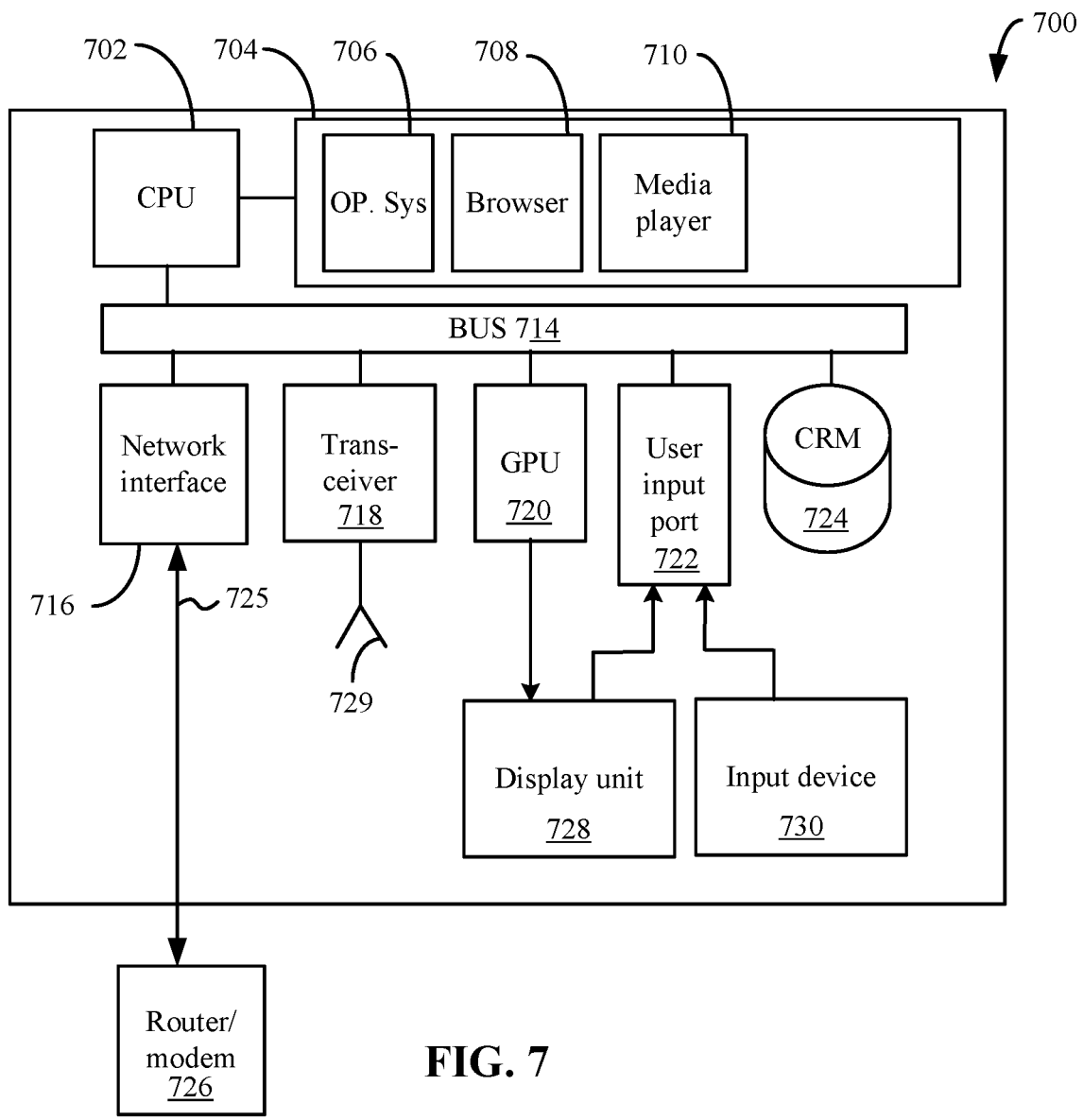
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by a computing device, a first chunk in a plurality of chunks from a video, the plurality of chunks sent to a plurality of transcoding units for transcoding in parallel;
    transcoding, by the computing device, the first chunk at a first transcoding unit using a first transcoding process to generate a first transcoded sub-bitstream;
    receiving, by the computing device, first statistical information about a video content characteristic from one or more second chunks being transcoded by other transcoding units;
    comparing, by the computing device, the first statistical information from the one or more second chunks to second statistical information about the video content characteristic from the first chunk;
    determining, by the computing device, whether to perform a second transcoding process based on a result of the comparing;
    when the second transcoding process is to be performed, performing, by the computing device, the second transcoding process to re-transcode the first chunk to generate a second transcoded bitstream and outputting the second transcoded bitstream for inclusion into an assembled bitstream without the first transcoded sub-bitstream; and
    when the second transcoding process is not to be performed, outputting, by the computing device, the first transcoded sub-bitstream for inclusion into the assembled bitstream.

2. The method of claim 1, wherein determining whether to perform the second transcoding process comprises:
    comparing a difference between the first statistical information from one or more chunks and the second statistical information from the first chunk to a threshold;
    determining the second transcoding process should be performed when the difference meets the threshold; and
    determining the second transcoding process should not be performed when the difference does not meet the threshold.

3. The method of claim 2, wherein the second transcoding process should be performed when the difference from a comparison of a type of first statistical information to a type of second statistical information meets the threshold.

4. The method of claim 2, wherein the second transcoding process should be performed when the difference from a comparison of a plurality of types of first statistical information to a plurality of types of second statistical information meet the threshold.

5. The method of claim 1, wherein performing the second transcoding process with the first chunk comprises:
    selecting altered parameters that are different from parameters used in the first transcoding process transcoding; and
    using the altered parameters in the second transcoding process.

6. The method of claim 5, wherein the altered parameters are determined from the first statistical information.

7. The method of claim 1, wherein the first statistical information from the one or more chunks comprises statistical information from one or more chunks from before the first chunk and statistical information from one or more chunks from after the first chunk.

8. The method of claim 7, wherein
    a first number of the one or more chunks from before the first chunk is determined based on a content analysis of the one or more chunks from before the first chunk and the first chunk, and
    a second number of the one or more chunks from after the first chunk is determined based on a content analysis of the one or more chunks from after the first chunk and the first chunk.

9. The method of claim 7, wherein a first number of the one or more chunks from before the first chunk is a first fixed number and a second number of the one or more chunks from after the first chunk is a second fixed number.

10. The method of claim 1, wherein each of the plurality of transcoding units determines whether to perform the second transcoding process.

11. The method of claim 1, wherein the first statistical information about the video content characteristic comprises content characteristics describing characteristics of content in the one or more second chunks and the first chunk.

12. The method of claim 11, wherein the content characteristics comprise content complexities describing content of the one or more second chunks and the first chunk and temporal complexities describing temporal characteristics of the one or more second chunks and the first chunk.

13. The method of claim 1, wherein determining whether to perform the second transcoding process is determined without comparing content of the first chunk and content of the one or more second chunks.

14. The method of claim 1, further comprising:
assembling the sub-bitstreams from the first transcoding process or the second transcoding process from the plurality of transcoding units to form the assembled bitstream.

15. The method of claim 14, wherein the assembled bitstream includes at least one first transcoding process of a first chunk and at least one second transcoding process of a second chunk.

16. A non-transitory computer-readable storage medium containing instructions, that when executed, control a computer system to be configured for:
receiving a first chunk in a plurality of chunks from a video, the plurality of chunks sent to a plurality of transcoding units for transcoding in parallel;
transcoding the first chunk at a first transcoding unit using a first transcoding process to generate a first transcoded sub-bitstream;
receiving first statistical information about a video content characteristic from one or more second chunks being transcoded by other transcoding units;
comparing the first statistical information from the one or more second chunks to second statistical information about the video content characteristic from the first chunk;
determining whether to perform a second transcoding process based on a result of the comparing;
when the second transcoding process is to be performed, performing the second transcoding process to re-transcode the first chunk to generate a second transcoded bitstream and outputting the second transcoded bitstream for inclusion into an assembled bitstream without the first transcoded sub-bitstream; and
when the second transcoding process is not to be performed, outputting the first transcoded sub-bitstream for inclusion into the assembled bitstream.

17. The non-transitory computer-readable storage medium of claim 16, wherein determining whether to perform the second transcoding process comprises:
comparing a difference between the first statistical information from one or more chunks and the second statistical information from the first chunk to a threshold;
determining the second transcoding process should be performed when the difference meets the threshold; and
determining the second transcoding process should not be performed when the difference does not meet the threshold.

18. The non-transitory computer-readable storage medium of claim 16, wherein performing the second transcoding process with the first chunk comprises:
selecting altered parameters that are different from parameters used in the first transcoding process; and
using the altered parameters in the second transcoding process.

19. An apparatus comprising:
one or more computer processors; and
a non-transitory computer-readable storage medium comprising instructions, that when executed, control the one or more computer processors to be configured for:
receiving a first chunk in a plurality of chunks from a video, the plurality of chunks sent to a plurality of transcoding units for transcoding in parallel;
transcoding the first chunk at a first transcoding unit using a first transcoding process to generate a first transcoded sub-bitstream;
receiving first statistical information about a video content characteristic from one or more second chunks being transcoded by other transcoding units;
comparing the first statistical information from the one or more second chunks to second statistical information about the video content characteristic from the first chunk;
determining whether to perform a second transcoding process based on a result of the comparing;
when the second transcoding process is to be performed, performing the second transcoding process to re-transcode the first chunk to generate a second transcoded bitstream and outputting the second transcoded bitstream for inclusion into an assembled bitstream without the first transcoded sub-bitstream; and
when the second transcoding process is not to be performed, outputting the first transcoded sub-bitstream for inclusion into the assembled bitstream.

20. The method of claim 1, wherein the assembled bitstream is assembled by:
receiving a first chunk from the first transcoding process of the first chunk and a second chunk from the first transcoding process of the second process;
inserting the first chunk from the first transcoding process into the assembled bitstream;
waiting for a third chunk from the second transcoding process; and
inserting the third chunk from the second transcoding process into the assembled bitstream after receiving the first chunk and the second chunk, the third chunk being in between the first chunk and the second chunk in the assembled bitstream.

* * * * *